(12) United States Patent
Minbuta et al.

(10) Patent No.: US 7,784,373 B2
(45) Date of Patent: Aug. 31, 2010

(54) LOAD SENSING DRIVE FORCE TRANSMISSION DEVICE

(75) Inventors: Hideaki Minbuta, Yokohama (JP); Motohiro Sotome, Ayase (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/962,082

(22) Filed: Dec. 20, 2007

(65) Prior Publication Data

US 2008/0148888 A1 Jun. 26, 2008

(30) Foreign Application Priority Data

Dec. 21, 2006 (JP) ............................... 2006-344229

(51) Int. Cl.
*F16H 3/06* (2006.01)
*F16H 1/24* (2006.01)
(52) U.S. Cl. .................. 74/89.23; 74/89.39; 74/424.94
(58) Field of Classification Search ................ 74/89.23, 74/89.37, 89.38, 89.39, 424.94; 192/141; 901/31, 36, 38; 294/81.2, 88
See application file for complete search history.

(56) References Cited

U.S. PATENT DOCUMENTS

| 3,563,106 A | * | 2/1971 | Goodman | 74/89.39 |
| 3,730,016 A | * | 5/1973 | Miller | 74/424.94 |
| 4,348,044 A | * | 9/1982 | Wood, III | 294/88 |
| 5,895,084 A | * | 4/1999 | Mauro | 294/100 |
| 6,418,807 B2 | * | 7/2002 | Gladen | 74/89.33 |
| 6,546,825 B1 |   | 4/2003 | Kugle |  |

FOREIGN PATENT DOCUMENTS

| EP | 1 801 457 | 6/2007 |
| JP | 61-180064 | 8/1986 |
| JP | 05-288255 | 11/1993 |
| JP | 10-122323 | 5/1998 |
| JP | 11-089169 | 3/1999 |
| JP | 2002-542440 | 12/2002 |
| JP | 2003-214519 | 7/2003 |
| JP | 3664406 | 4/2005 |
| TW | 169560 | 9/1991 |
| TW | 241347 | 2/1995 |

* cited by examiner

*Primary Examiner*—Thomas R Hannon
*Assistant Examiner*—Phillip A Johnson
(74) *Attorney, Agent, or Firm*—Paul A. Guss

(57) ABSTRACT

Rotational motion of a male screw member is converted to linear motion of a female screw member that is screw engaged with the male screw member, thereby causing movement of a rod member for clamping an object. When a load from the object becomes larger than a predetermined value, and exceeds the frictional force of a viscous material and a friction plate, the female screw member is gradually turned and clamping continues while movement of the rod member is decelerated.

5 Claims, 5 Drawing Sheets

# LOAD SENSING DRIVE FORCE TRANSMISSION DEVICE

BACKGROUND OF THE INVENTION

1. Field of the Invention

The present invention relates to a load sensing drive force transmission device for converting rotational motion of a male screw member into linear movement of a female screw member, and whereby when a drive force is imparted to an object, the drive force is automatically adjustable in accordance with a load from the object.

2. Description of the Related Art

A conversion device is known, for example, which utilizes a screw mechanism in which a female screw member is screw-engaged with a male screw member that is connected to a drive shaft, and wherein rotational motion of the male screw member is converted into linear movement of the female screw member, for converting rotational motion from an electric motor or the like into linear movement and for imparting a drive force to an object.

In an ordinary screw mechanism, the transmission ratio between the male screw member and the female screw member is fixed, such that a large reduction ratio must be set beforehand in order to impart a large drive force to the object. However, when the reduction ratio is made large, even when the load is light, because the movement velocity of the female screw member is slow, a long time is required until the desired drive force can be attained.

Accordingly, a load sensing type drive force transmission device has been developed, in which the reduction ratio can be automatically switched responsive to loads from the object (see, Japanese Patent No. 3664406, the disclosure of which is expressly incorporated into the present specification by reference).

FIG. 5 is a cross sectional structural view of a conventional load sensing drive force transmission device 2. The load sensing drive force transmission device 2 is equipped with a male screw member 8 having one end thereof fixed to a rotational shaft 6 pivotally supported by an upper frame 4, a female screw member 10 screw-engaged with the male screw member 8, a movable case 14 attached via bearings 12a, 12b to the female screw member 10, and a pressing plate 18 affixed to the movable case 14 via a sleeve 16 through which the other end of the male screw member 8 passes.

The male screw member 8 is supported so as to be rotatable within the movable case 14 through bearings 20a, 20b. The female screw member 10 is set to have a larger effective diameter than the male screw member 8, such that the axis thereof is offset a predetermined amount with respect to the axis of the male screw member 8, and the female screw member 10 is rotatably supported in the movable case 14 through the bearings 12a, 12b. The female screw member 10 is movable with respect to the movable case 14. One end of the female screw member 10 is connected to the movable case 14 through brake shoes 22a, 22b, whereas the other end is connected to the movable case 14 through a spring 24.

In the load sensing drive force transmission device 2 which is constructed in this manner, when the male screw member 8 is rotated accompanying rotation of the rotational shaft 6, the female screw member 10, which is screw-engaged with the male screw member 8, is moved in the direction of the arrow, whereby the movable case 14 and the pressing plate 18 via the sleeve 16 also are moved in the direction of the arrow.

The pressing plate 18 applies a predetermined pressing force with respect to an object. When the load from the object with respect to the pressing plate 18 is at or below a predetermined value, because the female screw member 10 is pressed upon by the movable case 14 through the brake shoes 22a, 22b in accordance with a resilient force of the spring 24, the female screw member 10 does not rotate and continues to move toward the object together with the movable case 14. Accordingly, the movement velocity of the movable case 14 is determined by the pitch of the male screw member 8 and the female screw member 10.

When the pressing plate 18 has moved a predetermined amount and the load from the object becomes larger than the predetermined value, movement of the movable case 14 in the direction of the arrow is prevented by the object. At this time, upon rotation of the male screw member 8, the female screw member 10 accommodated inside the movable case 14 moves in the direction of the arrow relatively with respect to the movable case 14 against the resilient force of the spring 24, and accordingly the brake shoes 22a, 22b separate therefrom and the female screw member 10 attains a state in which it becomes rotatable with respect to the movable case 14.

In this case, because the effective diameter of the female screw member 10 is set to be larger than that of the male screw member 8, the female screw member 10 rotates at a reduction ratio determined in accordance with the ratio of their effective diameters. Accordingly, the movement velocity of the movable case 14 in the direction of the arrow is decelerated, and a large drive force is imparted to the object.

Incidentally, with the load sensing drive force transmission device 2 constructed as described above, when the brake shoes 22a, 22b separate away from each other, because the female screw member 10 is placed in a condition where it can be freely rotated through the bearings 12a, 12b, the reduction ratio and the drive force increase abruptly, with the disadvantage that shocks caused by this change are imparted to the object.

Further, in the case that the pressing plate 18 is moved from the state illustrated in FIG. 5 in a direction opposite to the arrows, since the brake shoes 22a, 22b do not separate away from each other, the reduction ratio and the drive force cannot be automatically adjusted corresponding to loads from the object. Accordingly, another disadvantage exists in that the direction in which the reduction ratio and the drive force are capable of being adjusted is restricted to one direction only.

SUMMARY OF THE INVENTION

An object of the present invention is to provide a load sensing drive force transmission device, in which a drive force that changes continuously responsive to loads can be imparted to an object, regardless of the direction at which the drive force is added, and without applying shocks to the object.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
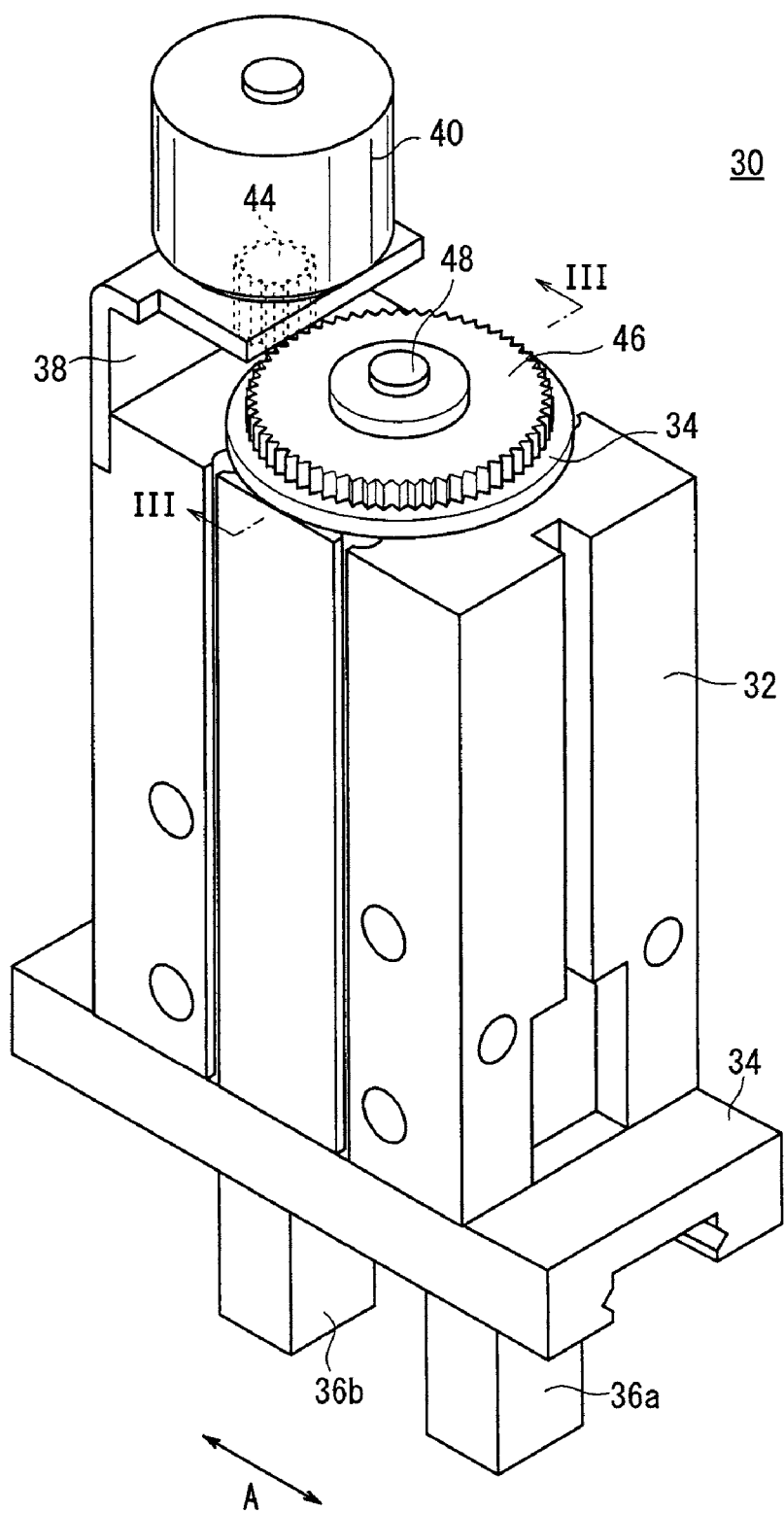
FIG. 1 is an exterior perspective view of a load sensing drive force transmission device according to the present embodiment.

FIG. 1 is an exterior perspective view of a load sensing drive force transmission device 30 according to the present embodiment. The load sensing drive force transmission device 30 is applied to a clamping mechanism for clamping an object, whereby a pair of clamps 36a, 36b, which approach and separate away from each other in the directions of the arrow A, engage with a guide member 34 that is affixed to the lower end of a housing 32. A motor (drive source) 40 is installed on an upper portion of the housing 32 through a bracket 38.

Figure 2:
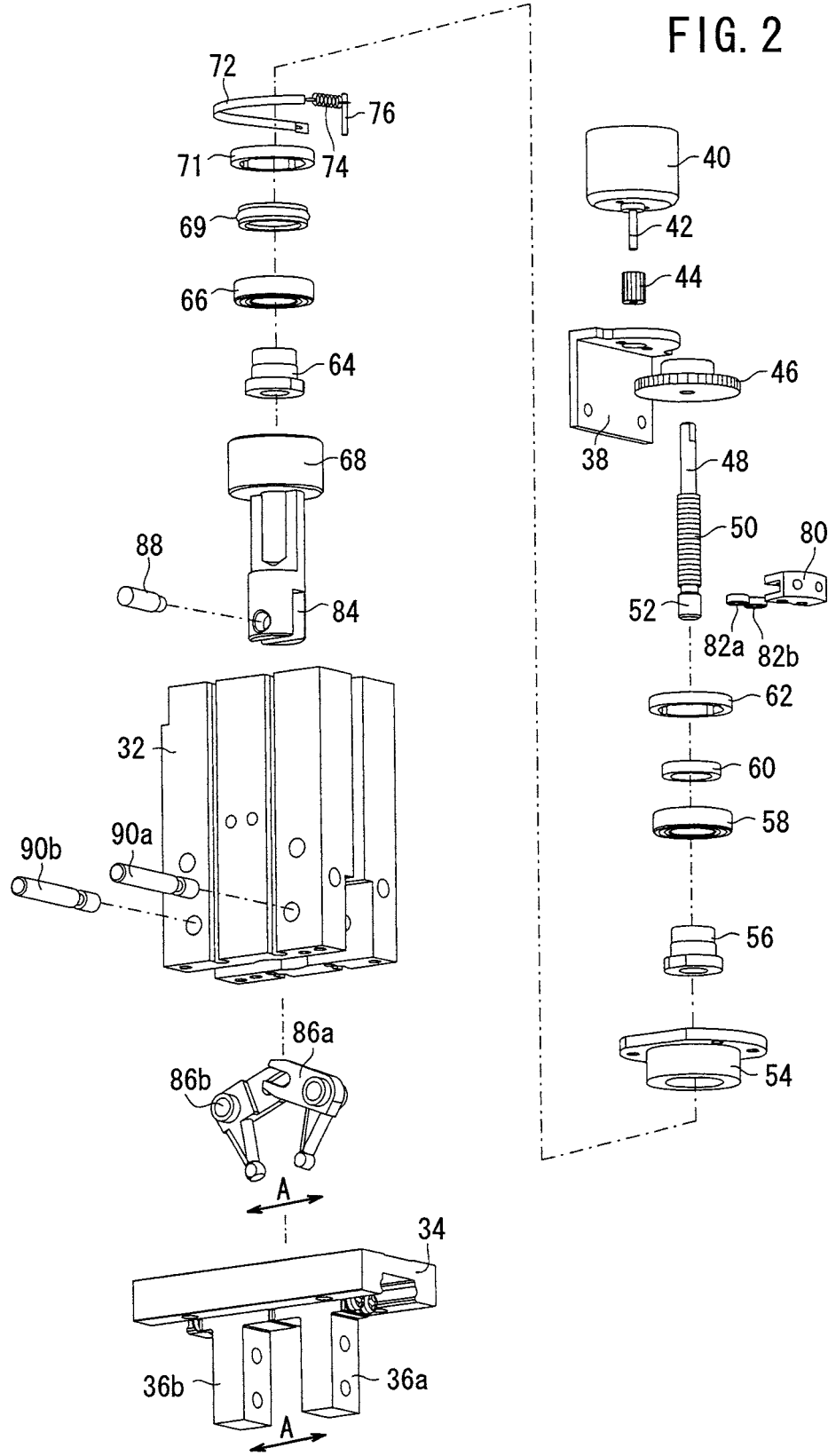
FIG. 2 is an exploded view of the load sensing drive force transmission device according to the present embodiment.
Figure 3:
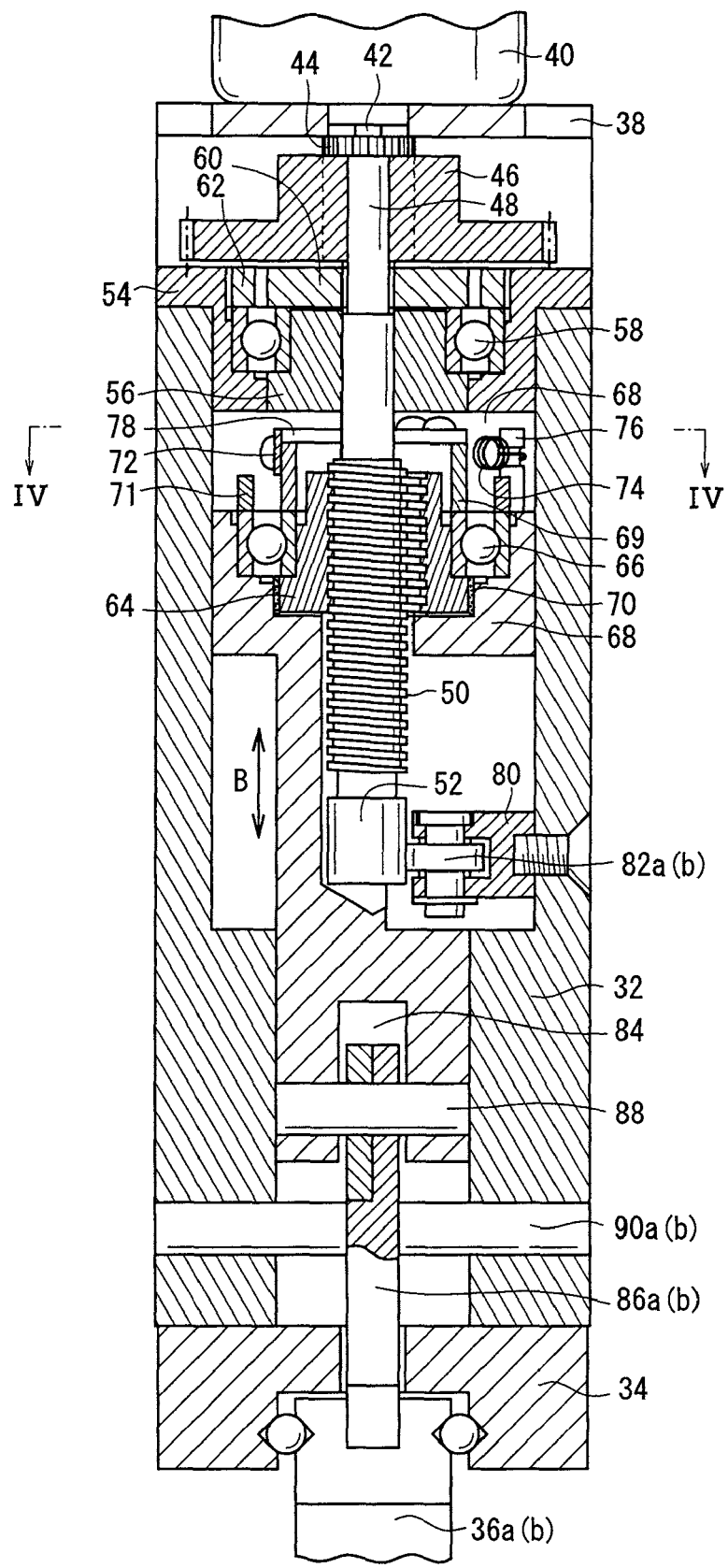
FIG. 3 is a cross sectional view taken along line III-III of the load sensing drive force transmission device shown in FIG. 1.

FIG. 2 is an exploded view of the load sensing drive force transmission device 30, and FIG. 3 is a cross sectional view taken along line III-III of the load sensing drive force transmission device 30.

A speed reduction gear 46 is meshed with a pinion gear 44 that is installed on the drive axis of the motor 40. One end of a rotatable shaft 48 engages with the speed reduction gear 46. The rotatable shaft 48 includes a male screw portion (male screw member) 50 formed on an intermediate portion thereof, and a roller portion 52 is formed at the other end of the rotatable shaft 48. The speed reduction gear 46 is installed on an upper part of the housing 32 through a retainer 54.

The rotatable shaft 48 is inserted through the retainer 54 via a bearing member 56. Between the retainer 54 and the bearing member 56, bearings (second bearing members) 58 are installed, which rotatably support the bearing member 56 together with the rotatable shaft 48. Bearing holders 60, 62 are installed between the speed reduction gear 46 and the bearings 58.

A female screw member 64, which is set to have an effective diameter larger than that of the male screw portion 50, and further, wherein the lead thereof is the same as the male screw portion 50, is screw-engaged with the male screw portion 50 formed on the rotatable shaft 48, in a state such that the axis thereof is offset. A large diameter part of a rod member (transmission member) 68 is connected through bearings (first bearing members) 66 to an outer circumferential portion of the female screw member 64. Accordingly, the female screw member 64 is configured so as to be capable of rotation with respect to the rod member 68. Bearing holders (an inner race and an outer race) 69, 71 are installed between the bearings 66 and the retainer 54.

Figure 4:
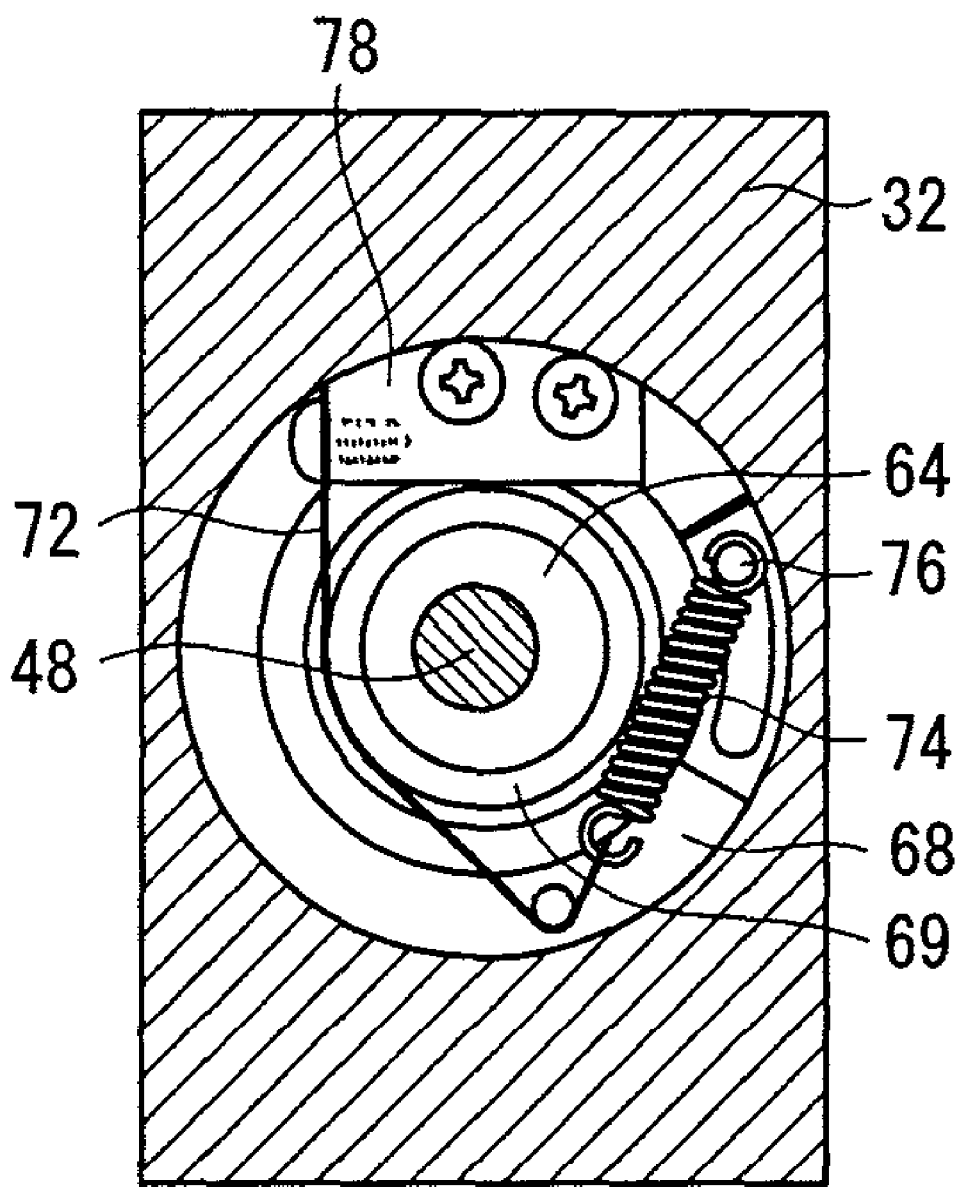
FIG. 4 is a cross sectional view taken along line IV-IV of the load sensing drive force transmission device shown in FIG. 3.
Figure 5:
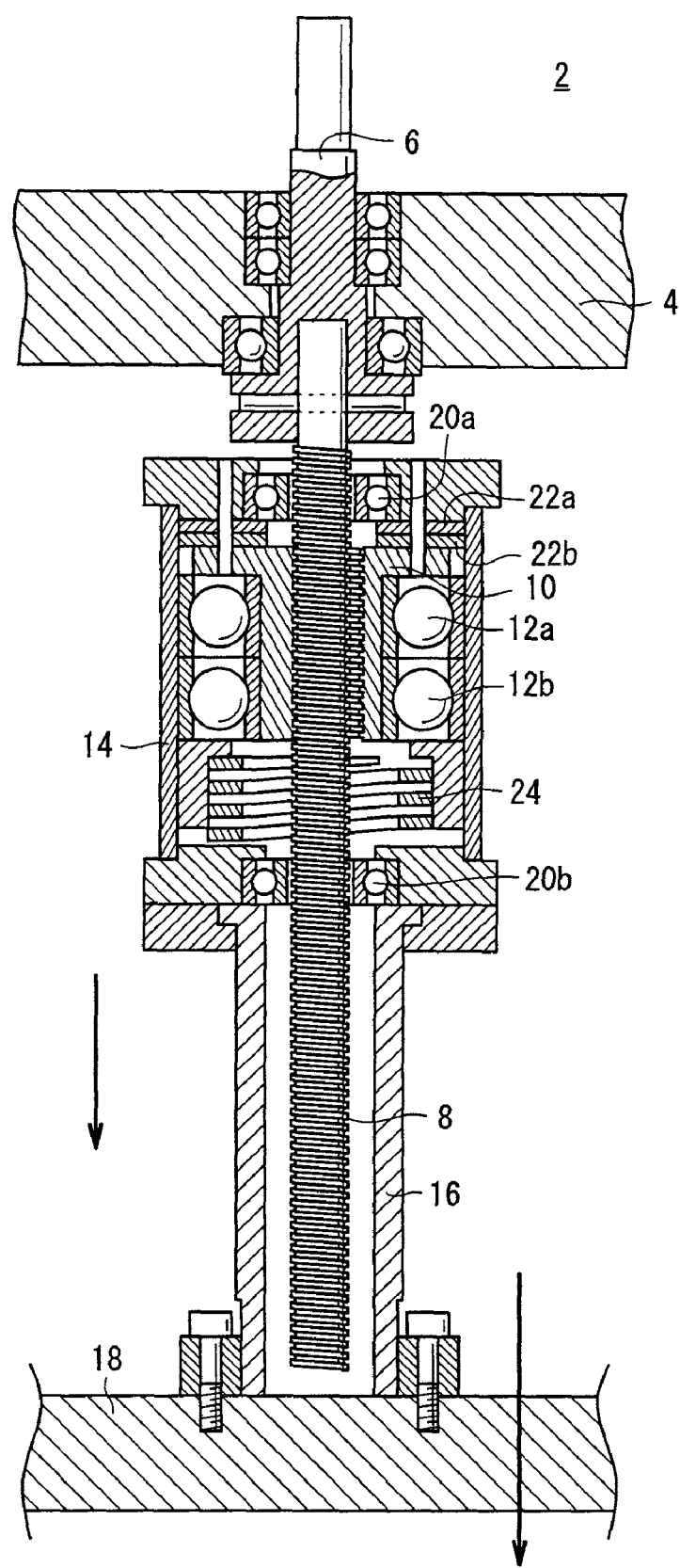
FIG. 5 is a cross sectional view of a load sensing drive force transmission device according to the conventional technique.

A gap 70 is formed between an outer circumferential portion of the female screw member 64 and the inner circumferential portion of the rod member 68, and a viscous material (frictional means) for imparting a predetermined frictional force is enclosed within the gap 70. A high viscosity grease can be used, for example, as the viscous material. Further, as shown in FIG. 4, a friction plate (frictional member) 72 for imparting a predetermined frictional force to the female screw member 64 is disposed in sliding contact therewith on an outer circumferential surface of the bearing holder 69 that is installed on the female screw member 64. One end of the friction plate 72 is fixed by a pin 76 that is embedded in the rod member 68 through a spring 74, whereas the other end thereof is affixed to a bracket 78 that is installed on the rod member 68. Rotation of the female screw member 64 with respect to the rod member 68 is suppressed, in accordance with the frictional force imparted to the female screw member 64 by the viscous material and the friction plate 72.

A pair of rollers (third bearing member) 82a, 82b, which is installed on the housing 32 through a bracket 80, abuts against the roller portion 52 that is formed at the other end of the rotatable shaft 48. The rollers 82a, 82b act to restrain shaking upon receipt of radial loads from the rotatable shaft 48.

A slit 84 is formed on a lower part of the rod member 68, and a pair of substantially V-shaped link members 86a, 86b engage within the slit 84. Respective ends of the link members 86a, 86b are axially supported by a common shaft 88 that is inserted through the slit 84, each of intermediate portions is axially supported by shafts 90a, 90b inserted through the housing 32, and clamps 36a, 36b are installed onto the other ends thereof.

The load sensing drive force transmission device 30 according to the present embodiment is basically constructed as described above. Next, operations and effects of the invention shall be explained.

When the object is clamped, from a state in which the clamps 36a, 36b are separated from each other, the rotatable shaft 48 is rotated by driving the motor 40, via the drive shaft 42, the pinion gear 44, and the speed reduction gear 46. At this time, the male screw portion 50 formed on the rotatable shaft 48 is turned, whereupon a rotational force that causes rotation of the female screw member 64, and a force in the direction of the arrow B that causes movement of the female screw member 64 toward the rod member 68, are applied with respect to the female screw member 64, which engages with the male screw portion 50.

In this case, while the object between the clamps 36a, 36b is in an unclamped state, a load is not applied from the object with respect to movement of the rod member 68 in the direction of the arrow B. Further, the female screw member 64 is prevented from rotation by the viscous resistance of the viscous material enclosed between the female screw member 64 and the rod member 68, as well as by sliding resistance of the friction plate 72 that slidably contacts the outer circumferential portion of the female screw member 64. Accordingly, rotational movement of the male screw portion 50 is converted solely into straightforward motion of the female screw member 64 that is threadedly engaged with the male screw portion 50 and, as a result, the rod member 68 moves swiftly in the direction of the arrow B.

Upon movement of the rod member 68 in the direction of the arrow B, movement of the clamps 36a, 36b in directions to approach each other is initiated through the link members 86a, 86b. When the clamps 36a, 36b are moved a predetermined amount and clamp the object, movement of the rod member 68 in the direction of the arrow B is decelerated. At this time, a load due to clamping of the object is conveyed to the female screw member 64 through the rod member 68.

As rotation of the male screw portion 50 continues in the above-described state, since movement of the female screw member 64 in the direction of the arrow B is decelerated, the force in the rotational direction of the female screw member 64 increases, such that the female screw member 64 itself begins to rotate, at a point in time when this force exceeds the frictional force produced by the viscous material and the friction plate 72.

In this case, the viscous material and the friction plate 72 are interposed between the female screw member 64 and the rod member 68. Since the frictional force produced by the viscous material and the friction plate 72, which are interposed between the female screw member 64 and the rod member 68, is dependent on the rotational speed of the female screw member 64 and continuously changes, the load from the object increases and the rotational speed of the female screw member 64 gradually increases, whereupon together therewith, the drive force with respect to the object also gradually increases.

As a result, the clamps 36a, 36b do not impart shocks to the object, and the clamps 36a, 36b carry out a smooth clamping operation. Further, the object can be suitably clamped as a result of the gradually increasing drive force.

Further, in accordance with utilizing the friction plate 72 in addition to the viscous material for the purpose of suppressing rotation of the female screw member 64, the effect of fluctuations in the frictional force due to the temperature of the viscous material can be suppressed as well.

On the other hand, in the case that the object is unclamped from a clamped state, since there is no restraint with respect to movement of the rod member 68 in the direction of the arrow B by the object, the female screw member 64 is not rotated and the rod member 68 is swiftly elevated, thereby separating the clamps 36a, 36b and enabling an unclamped state to be effected.

With the load sensing drive force transmission device 30 according to the present embodiment, when the rod member 68 is moved toward the side of the motor 40 shown in FIG. 3, and in the event that a load is imparted from an object that prevents movement of the rod member 68, the female screw member 64 rotates in opposition to the frictional force produced by the viscous material and the friction plate 72, whereby the rod member 68 is moved at a desired speed reduction ratio and drive force. Additionally, at a point in time when the load from the object becomes at or below a predetermined value, rotation of the female screw member 64 is stopped, whereupon the speed of movement of the rod member 68 increases. In this manner, in the load sensing drive force transmission device 30 of the present embodiment, the speed reduction ratio and drive force corresponding to the load can be automatically adjusted with respect to both directions of movement of the rod member 68.

In the aforementioned embodiment, a viscous material and the friction plate 72 are both utilized as the frictional means, however, either one of them can be used alone. Further, in place of the friction plate 72, a wire or the like, which is placed in sliding contact with the outer circumferential portion of the female screw member 64, may also be utilized.

The present invention is not limited to the above-described embodiment. It is a matter of course that various changes can be made freely thereto without departing from the essential character and gist of the present invention.

What is claimed is:

1. A load sensing drive force transmission device comprising:
   a male screw member rotatably driven by a drive source;
   a female screw member having an effective diameter set to be larger than that of said male screw member, and which is screw engaged with said male screw member in a state where an axis of said female screw member is offset with respect to an axis of said male screw member, and wherein said female screw member is movable in an axial direction by rotation of said male screw member;
   an inner race connected to said female screw member and an outer race disposed radially outside of and concentric with said inner race, with first bearing members disposed between said inner race and said outer race, wherein said female screw member is rotatably supported on said transmission member through said first bearing members;
   a transmission member that transmits a drive force generated by axial movement of said female screw member to an object;
   a clamp connected to said transmission member for clamping said object; and
   frictional means connected to said transmission member in a state enabling rotation of said female screw member, which by abutment against said inner race prevents rotation of said female screw member in two directions when a load from said object applied through said clamp with respect to said drive force is at or below a predetermined value, and which progressively enables greater rotation of said female screw member in two directions as said load increases further in excess of said predetermined value,
   wherein said frictional means remains operatively coupled to said female screw member at all times including when said female screw member rotates.

2. The load sensing drive force transmission device according to claim 1, wherein said frictional means comprises a viscous material enclosed between said female screw member and said transmission member, for imparting a predetermined frictional force to said female screw member.

3. The load sensing drive force transmission device according to claim 1, wherein said frictional means comprises a friction plate connected to said transmission member in sliding contact along an outer circumferential surface of said inner race connected to said female screw member, for imparting a predetermined frictional force to said female screw member through said inner race.

4. The load sensing drive force transmission device according to claim 1, wherein said frictional means comprises a viscous material enclosed between said female screw member and said transmission member for imparting a predetermined frictional force to said female screw member, and a friction plate connected to said transmission member in sliding contact along an outer circumferential surface of said inner race connected to said female screw member for imparting a predetermined frictional force to said female screw member through said inner race.

5. The load sensing drive force transmission device according to claim 1, wherein an entire outer circumference of one end of said male screw member is rotatably supported by a second bearing member, and a portion of an outer circumference of the other end of said male screw member is rotatably supported by a third bearing member, in order to screw-engage said male screw member with said female screw member.

* * * * *